March 26, 1968     M. R. BARROWS     3,375,377
RADIATION SENSITIVE MULTICHANNEL PRESSURE TRANSDUCER
Filed Sept. 21, 1964     2 Sheets-Sheet 2
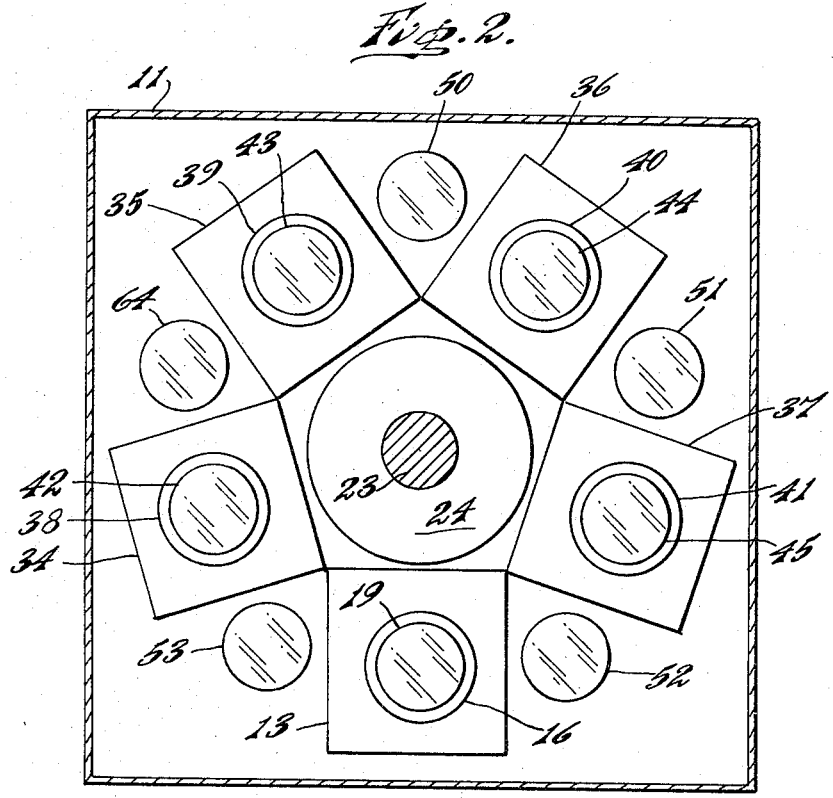
INVENTOR.
Martin R. Barrows
BY John R. Ewbank
ATTORNEY United States Patent Office 3,375,377
Patented Mar. 26, 1968

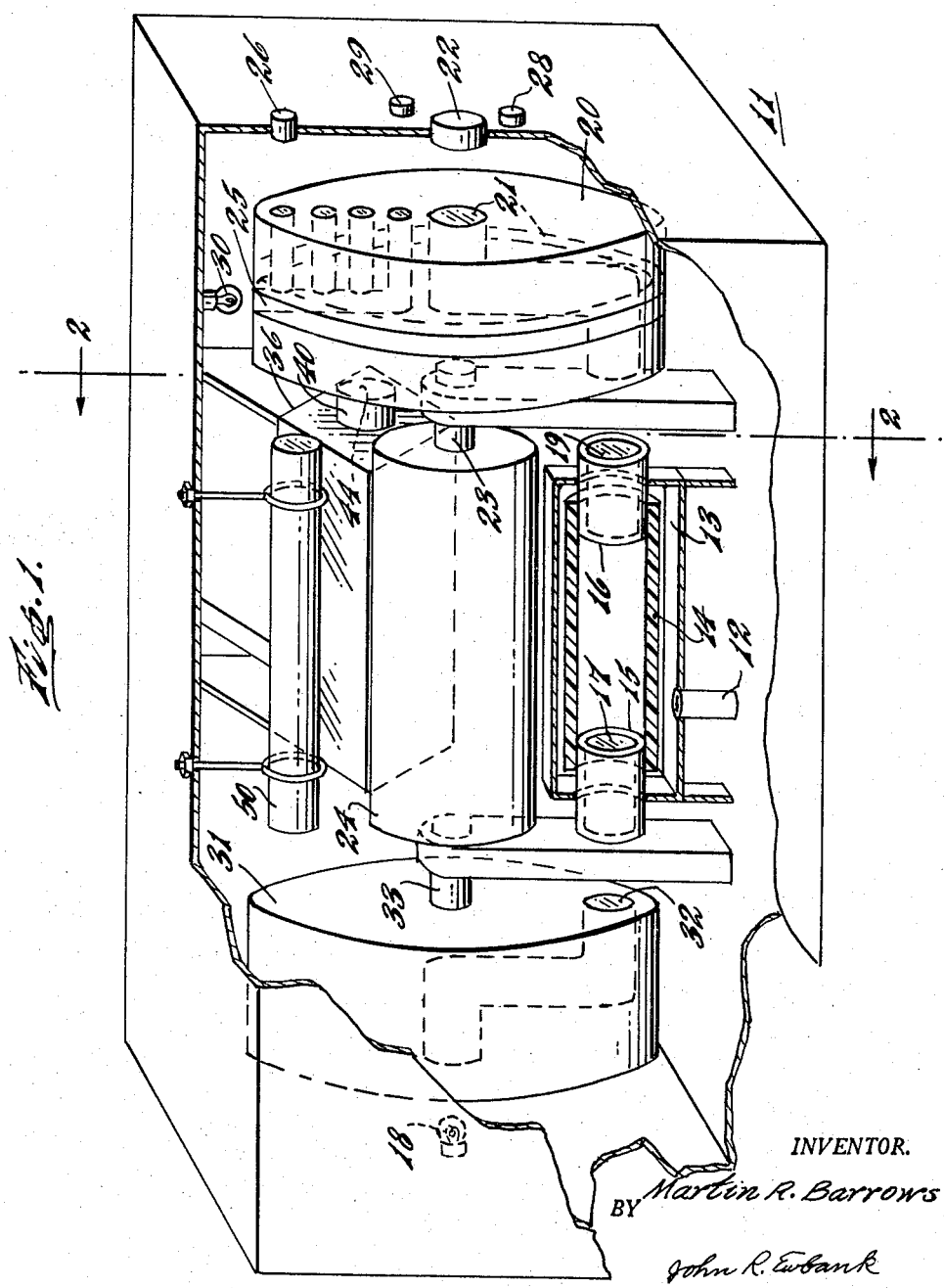

3,375,377
RADIATION SENSITIVE MULTICHANNEL
PRESSURE TRANSDUCER
Martin Ralph Barrows, N. Wales Road,
North Wales, Pa. 19454
Filed Sept. 21, 1964, Ser. No. 397,874
2 Claims. (Cl. 250—231)

ABSTRACT OF THE DISCLOSURE

The pressure in a pressure chamber serves to expand or contract an elastomeric tube, which acts as a shutter regulating the amount of light passing from a uniform light source toward the photoelectric cell. A plurality of such elastomeric tube type of valves are parallel longitudinally around a cylindrical frame. A pair of scanning heads rotate to obtain a series of signals from the photocell responsive to the pressures in the respective pressure chambers of the valves. Optical rods of polymethacrylate control the direction of light from its source, through the elastomeric tube, and to the photocell.

---

This invention relates to an improved method for measuring pressure and more particularly concerns a pressure transducer which will measure a multiplicity of pressures through the use of photocells.

Heretofore pressure has been measured by the use of potentiometers, strain gages, differential transformers and variable reluctance devices. The disadvantage of potentiometers is that of limited life because of rubbing parts causing wear and failure. Another disadvantage of the potentiometer is that its accuracy is limited because of friction involved. The disadvantage of the strain gage is that it has extremely low output. Another disadvantage is that it requires the use of extensive electronic circuitry. The differential transformer and the variable reluctance devices also require extensive electronics for the maintenance of constant frequency input as well as additional electronics for conditioning of electrical output. Accordingly it is the object of this invention to overcome the aforementioned problems and disadvantages.

Other objects and disadvantages of this invention will become apparent hereinafter and in the drawings in which:

FIGURE 1 is a perspective of the transducer constructed in accordance with this invention with parts broken away in order to illustrate important details.

FIGURE 2 is a cross section taken on line 2—2 of FIGURE 1.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the embodiment of the invention selected for illustration in the drawing, specifically to FIGURE 1, the number 11 designates generally an instrument for the measurement and scanning of pressure which is fed into a multiple of ports, one of which is pressure port 12. Pressure port 12 leads to pressure chamber 13 which has in it elastomeric tube 14 which is attached to metal tube 15 and metal tube 16. Metal tube 15 has contained in it light-conducting optical rod 17. Metal tube 16 has contained in it light-conducting optical rod 19. The end of optical rod 17 which faces away from pressure chamber 13 faces scanning head 31 which has optical rod 32 imbedded in it. Optical rod 32 leads to light source 18. Optical rod 19 faces on its surface external to pressure chamber 13 scanning head 20 which has imbedded in it optical rod 21 which leads to photocell 22. Scanning heads 20 and 31 are connected to motor 24 by shafts 23 and 33. Motor 24 is connected to an electrical circuit including a source of power and measuring and regulating instruments as desired. Light source 18 is connected to an electrical circuit (not shown) including a source of power and measuring and regulating instruments as desired.

Photocell 22 (photosensitive or photovoltaic) is connected to an electrical circuit including a source of power and measuring and regulating instruments as desired. Scanning head 20 also has imbedded in it another light-conducting optical rod 25. This leads by radical and horizontal extensions as shown in FIGURE 1 to the circumferential surface of the scanning head at one end, to the surface facing photocells 26, 28 and 29 at the other end. The circumferential opening leads to light source 30 which is connected to an electrical circuit (not shown). Photocells 26, 28 and 29 lead to a measuring instrumentation (not shown). The number of optical rod openings leading to photocells 26, 28 and 29 varies according to a binary code with the position of the particular optical rod in the scanning head 20.

In FIGURE 2 are found five pressure chambers 13, 34, 35, 36, and 37 from which are leading metal tubes 16, 38, 39, 40, 41 which have contained in them optic rods 19, 42, 43, 44, 45. Visible is motor 24 and shaft 23. Optic rods 64, 50, 51, 52, 53 lead directly from scanning head 31 to scanning head 20.

In operation, light beam from light source 18 travels through optical tube 32 thence through optical tube 17 through the opening in pressure chamber 13 thence through optical tube 19. From this point it is picked up by optical rod 21 in scanning head 20 and then by photocell 22. This will give a reading on the measuring instrumentation attached to photocell 22. When an increased pressure is applied to pressure chamber 13 through pressure port 12, elastomeric tube 14 begins to collapse, thus allowing less light to pass through the chamber to photocell 22. The decrease in light received by photocell 22 is measured by the measuring instrumentation attached to photocell 22. By gaging the corresponding light increase or decrease to the increase or decrease in pressure an accurate reading of pressure can be obtained. The rotation of scanning heads 20 and 31 by motor 24 enables photocell 22 to sense consecutively the light being sent from pressure chambers 13, 34, 35, 36 and 37. The chambers are arranged so that light coming from a pressure chamber such as 13 is first sensed by scanning head 20 and then light coming from an optical rod such as 64 is then sensed by scanning head 20. The light from optical rod 64 comes directly from light source 18 and acts as a source reference. Pressure in the pressure chamber is measured by measuring the pulse height difference between the pressure variable pulse and the reference pulse.

Light from light source 30 travels through optical rod 25 to either photocell 26, 28, 29 or any of these photocells or to any combination of these photocells according to the binary code which is used. The instrumentation attached to photocells 26, 28, 29 allows indication as to the particular pressure port which has been sensed by photocells 22. The optical rod 25 comprises an annular portion collecting light from light source 30 and transmitting it to the points at which the fixed photocells 26, 28, and 29 can receive the light, this system operating to provide an electrical signal indicative of the angular position of the second scanning head, and thus indicates which of the pressure chamber pressures is being measured by the pressure transducer.

It is to be unsdertood that the form of this invention herewith shown and described is to be taken as a preferred embodiment. Various changes can be made in the shape, size, and arrangement of parts. For example, the use of a flat elliptical tubing instead of circular cross-sectional elastomeric tubing in the pressure chamber can cause a snap-type closing action, thereby allowing the transducer to be adapted to a pressure switch use. Another example is that of a transducer-scanner built along the same lines using two photocells, one sensing the light source and the other sensing the light from the pressure chamber. Since both photocells are sensing the light emanating from a single source it is possible to eliminate the effects of variation of intensity and spectral characteristics through this method.

Having thus described my invention I claim:

1. A pressure transducer for the scanning of a plurality of pressure chambers comprising the combination of: an electrical motor; a first scanning head; a second of a pair of scanning heads; a cylindrical frame; means transmitting rotational movement from the electrical motor to provide relative rotational coaxial movement between the cylindrical frame and the pair of scanning heads; a light source at the axis of the first scanning head; an optical rod in the first scanning head transmitting light from the light source to an outer portion of a disklike face of the first scanning head; a plurality of generally parallel optical rods secured to the cylindrical frame, each being generally parallel to the axis of the cylindrical frame and positioned to receive light from the optical rod of the first scanning head during angular alignment thereof; a photoelectric cell at the axis of the second scanning head; an optical rod in the second scanning head transmitting light received during angular alignment of one of the parallel optical rods and the optical rod in the second scanning head; and a plurality of light valves parallel to and spaced arcuately from the parallel optical rods, each valve comprising an optical rod alignable with the optical rod of the first scanning head, an optical rod alignable with the optical rod of the second scanning head, and therebetween a light constriction zone, there being an elastomeric tube in the light constriction zone, said tube being expandable and contractable in response to changes of pressure in a pressure chamber, and there being a port for communication of pressure from the pressure chamber to a pressure zone to be measured, whereby rotation of the electrical motor permits the photocell to send a pattern of electrical signals responsive to the changing angular alignment of the scanning heads with each of the light valves and each of the parallel optical rods, each of said parallel optical rods providing a control signal, and each of said light valves providing a signal responsive to the pressure in its pressure chamber.

2. The instrument of claim 1 in which a plurality of photocells are positioned to receive light signals indicative of the angular position of the scanning head, whereby the signal for the pressure being measured by a light valve may be identified simultaneously by the signals from at least one of the plurality of angular position indication photocells.

References Cited
UNITED STATES PATENTS

| | | | |
|---|---|---|---|
| 2,118,029 | 5/1938 | Boyd | 73—397 X |
| 2,449,953 | 9/1948 | Rippingille | 250—231 X |
| 2,659,563 | 11/1953 | Sace | 250—231 X |
| 2,666,650 | 1/1954 | MacDonell | 250—231 X |
| 2,990,705 | 7/1961 | Bochan | 251—5 |
| 3,051,003 | 8/1962 | Witt | 250—227 X |
| 3,122,922 | 3/1964 | Kramer | 73—398 |
| 3,159,750 | 12/1964 | Kazan | 73—398 X |
| 3,161,769 | 12/1964 | McPherson | 250—227 X |

WALTER STOLWEIN, *Primary Examiner.*

RALPH G. NILSON, *Examiner.*

J. D. WALL, *Assistant Examiner.*